US011662028B2

(12) United States Patent
Lee

(10) Patent No.: US 11,662,028 B2
(45) Date of Patent: May 30, 2023

(54) BUTTERFLY VALVE AND METHOD OF MANUFACTURING THE SAME

(71) Applicant: Sang Seon Lee, Wonju-si (KR)

(72) Inventor: Sang Seon Lee, Wonju-si (KR)

( * ) Notice: Subject to any disclaimer, the term of this patent is extended or adjusted under 35 U.S.C. 154(b) by 0 days.

(21) Appl. No.: 17/488,483

(22) Filed: Sep. 29, 2021

(65) Prior Publication Data

US 2022/0018448 A1 Jan. 20, 2022

Related U.S. Application Data

(63) Continuation of application No. 16/659,489, filed on Oct. 21, 2019, now Pat. No. 11,199,266, which is a continuation of application No. PCT/KR2019/000975, filed on Jan. 23, 2019.

(30) Foreign Application Priority Data

| Apr. 25, 2018 | (KR) | 10-2018-0048160 |
| Dec. 21, 2018 | (KR) | 10-2018-0167205 |
| Dec. 21, 2018 | (KR) | 10-2018-0167458 |
| Dec. 21, 2018 | (KR) | 10-2018-0167459 |
| Dec. 21, 2018 | (KR) | 10-2018-0167460 |
| Dec. 21, 2018 | (KR) | 10-2018-0167461 |

(51) Int. Cl.
*F16K 1/22* (2006.01)
*B23P 15/00* (2006.01)
*B29C 70/68* (2006.01)
*B29K 705/00* (2006.01)
*B29L 31/00* (2006.01)

(52) U.S. Cl.
CPC ............ *F16K 1/222* (2013.01); *B23P 15/001* (2013.01); *B29C 70/68* (2013.01); *B29K 2705/00* (2013.01); *B29L 2031/7506* (2013.01)

(58) Field of Classification Search
CPC .... F16K 1/222; F16K 25/005; F16K 27/0218; B23P 15/001; B29C 70/68; B29K 2705/00; B29L 2031/7506
See application file for complete search history.

(56) References Cited

U.S. PATENT DOCUMENTS

| 3,425,439 A | * | 2/1969 | Duffey | F16K 1/2265 251/308 |
| 3,670,071 A | | 6/1972 | Walchle | |
| 4,510,965 A | * | 4/1985 | Peroux | F16K 27/0272 251/305 |
| 5,150,731 A | * | 9/1992 | Jiro | F16K 1/2265 137/375 |
| 5,360,030 A | | 11/1994 | Sisk | |
| 9,222,592 B2 | | 12/2015 | Tsai | |
| 11,199,266 B2 | * | 12/2021 | Lee | F16K 25/005 |

(Continued)

FOREIGN PATENT DOCUMENTS

| JP | 2005114140 A | 4/2005 |
| JP | 2007192374 A | 8/2007 |

(Continued)

*Primary Examiner* — Michael R Reid

(57) ABSTRACT

A body covering a disk in a butterfly valve comprises: an upper body; and a lower body, wherein an inserting space is formed by combining the upper body with the lower body, the disk is inserted into the inserting space, and at least one of the upper body and the lower body includes a framework formed of a metal and a plastic layer formed on the framework.

3 Claims, 5 Drawing Sheets

(56) References Cited

U.S. PATENT DOCUMENTS

| | | | |
|---|---|---|---|
| 2008/0173841 A1 | 7/2008 | Sisk | |
| 2010/0065763 A1* | 3/2010 | Suetome | B29C 45/1459 251/366 |
| 2016/0178067 A1* | 6/2016 | Abouelleil | F16K 1/2265 251/308 |

FOREIGN PATENT DOCUMENTS

| | | |
|---|---|---|
| JP | 2008002512 A | 1/2008 |
| JP | 2017032062 A | 2/2017 |
| JP | 2017223323 A | 12/2017 |
| KR | 1020110118081 A | 10/2011 |
| KR | 10-1241998 B1 | 3/2013 |
| KR | 10-1749350 B1 | 6/2017 |

* cited by examiner

BUTTERFLY VALVE AND METHOD OF MANUFACTURING THE SAME

CROSS-REFERENCE TO RELATED APPLICATIONS

This application is a continuation application of U.S. application Ser. No. 16/659,489, which was filed on Oct. 21, 2019, and which is a continuation application of U.S. application Ser. No. 16/659,489, which was filed on Oct. 21, 2019, and which is a continuation application of PCT application filed on Jan. 23, 2019 and assigned Serial No. PCT/KR2019/000975, and which claims priority from Korean Patent Application No. 10-2018-0048160 filed with the Korean Intellectual Property Office on Apr. 25, 2018, Korean Patent Application No. 10-2018-0167205 filed with the Korean Intellectual Property Office on Dec. 21, 2018, Korean Patent Application No. 10-2018-0167458 filed with the Korean Intellectual Property Office on Dec. 21, 2018, Korean Patent Application No. 10-2018-0167460 filed with the Korean Intellectual Property Office on Dec. 21, 2018, Korean Patent Application No. 10-2018-0167461 filed with the Korean Intellectual Property Office on Dec. 21, 2018, and Korean Patent Application No. 10-2018-0167459 filed with the Korean Intellectual Property Office on Dec. 21, 2018. The entire disclosures of above patent applications are incorporated herein by reference.

TECHNICAL FIELD

The present disclosure relates to a butterfly valve and method of manufacturing the same.

BACKGROUND

Conventional butterfly valve is formed of only steel, and thus its strength is high, but it is easy to be corroded, its weight is heavy and its manufacture cost has increased. Specially, the butterfly valve should be precisely processed, but it is difficult to process precisely the butterfly valve because the butterfly valve is formed of the steel. Accordingly, it is impossible to achieve mass production.

SUMMARY

To solve problem of the convention technique, the present disclosure is to provide a butterfly valve which may enhance corrosion resistance or acid resistance with keeping its strength, have light weight and realize mass production, and method of manufacturing the same.

A butterfly valve according to an embodiment of the present disclosure comprises a body in which an inserting space is formed; and a disk inserted into the inserting space of the body. Here, fluid flow is opened or closed in response to rotation of the disk. The disk includes: a disk body formed of a metal; a first plastic layer formed of a first plastic on the disk body; and a second plastic layer formed of a second plastic on the first plastic layer, wherein a melting point of the first plastic layer is higher than a melting point of the second plastic layer.

A disk used in a butterfly valve according to an embodiment of the present disclosure comprises a disk body formed of a metal; a first plastic layer formed on the disk body and formed of a first plastic; and a second plastic layer formed on the first plastic layer and formed of a second plastic. Here, wherein a melting point of the first plastic is different from a melting point of the second plastic.

A body covering a disk in a butterfly valve according to an embodiment of the present disclosure comprises: an upper body; and a lower body. Here, an inserting space is formed by combining the upper body with the lower body, the disk is inserted into the inserting space, and at least one of the upper body and the lower body includes a framework formed of a metal and a plastic layer formed on the framework.

A fluid contacting member contacted with a fluid in a valve according to an embodiment of the present disclosure comprises: a body formed of a metal and manufactured by using a mechanical processing; a first plastic layer formed on the body and formed of a first plastic; and a second plastic layer formed on the first plastic layer and formed of a second plastic. Here, the plastic layers are formed through an insert molding, and a melting point of the first plastic is different from a melting point of the second plastic.

A method of manufacturing a disk used in a butterfly valve according to an embodiment of the present disclosure comprises: forming a first plastic layer on a disk body formed of a metal through an insert molding; and forming a second plastic layer on the first plastic layer through an insert molding. Here, a melting point of a first plastic of the first plastic layer is different from a melting point of a second plastic of the second plastic layer.

Butterfly valve and method of manufacturing the same according to the present disclosure use a disk including a disk body formed of a metal and plastic layers formed on the disk body through an insert molding, thus the butterfly valve may have enhanced corrosion resistance or acid resistance with keeping similar strength to a butterfly valve formed of only steel.

Additionally, a weight of the butterfly valve has reduced, it is easy to mold the butterfly valve and so it is possible to achieve mass production. Of course, it is possible to manufacture precisely the butterfly valve.

BRIEF DESCRIPTION OF DRAWINGS

Example embodiments of the present disclosure will become more apparent by describing in detail example embodiments of the present disclosure with reference to the accompanying drawings, in which.

DETAILED DESCRIPTION

In the present specification, an expression used in the singular encompasses the expression of the plural, unless it has a clearly different meaning in the context. In the present specification, terms such as "comprising" or "including," etc., should not be interpreted as meaning that all of the elements or operations are necessarily included. That is, some of the elements or operations may not be included, while other additional elements or operations may be further included. Also, terms such as "unit," "module," etc., as used in the present specification may refer to a part for processing at least one function or action and may be implemented as hardware, software, or a combination of hardware and software.

Embodiments of the present disclosure relate to a valve, particularly a butterfly valve. The butterfly valve may have enhanced lifetime and corrosion resistance, etc. with keeping similar strength and precision to a butterfly valve formed of only steel. Furthermore, manufacture cost of the butterfly may be considerably reduced, productivity of the butterfly valve may be highly enhanced and it is possible to realize mass production.

Conventional butterfly valve is formed of only steel, and thus its strength is high, but it is difficult to process precisely the butterfly valve and so productivity of the butterfly valve has lowered and manufacturing cost of the butterfly valve is high. Moreover, the butterfly valve has been easily corroded when it is used in a ship, a water treatment apparatus (a seawater desalination apparatus, a wastewater treatment apparatus) and so on, and thus it can't use the butterfly valve more than one year.

The butterfly valve of the present disclosure may enhance corrosion resistance, lifetime (more than 10 years), reduce manufacturing cost and reduce weight by molding plastic on a metal, e.g. a light metal such as aluminum.

Of course, the present technique is not limited to the butterfly valve, and it is applicable to any valves as described below.

Hereinafter, various embodiments of the disclosure will be described in detail with reference to accompanying drawings.

Figure 1:
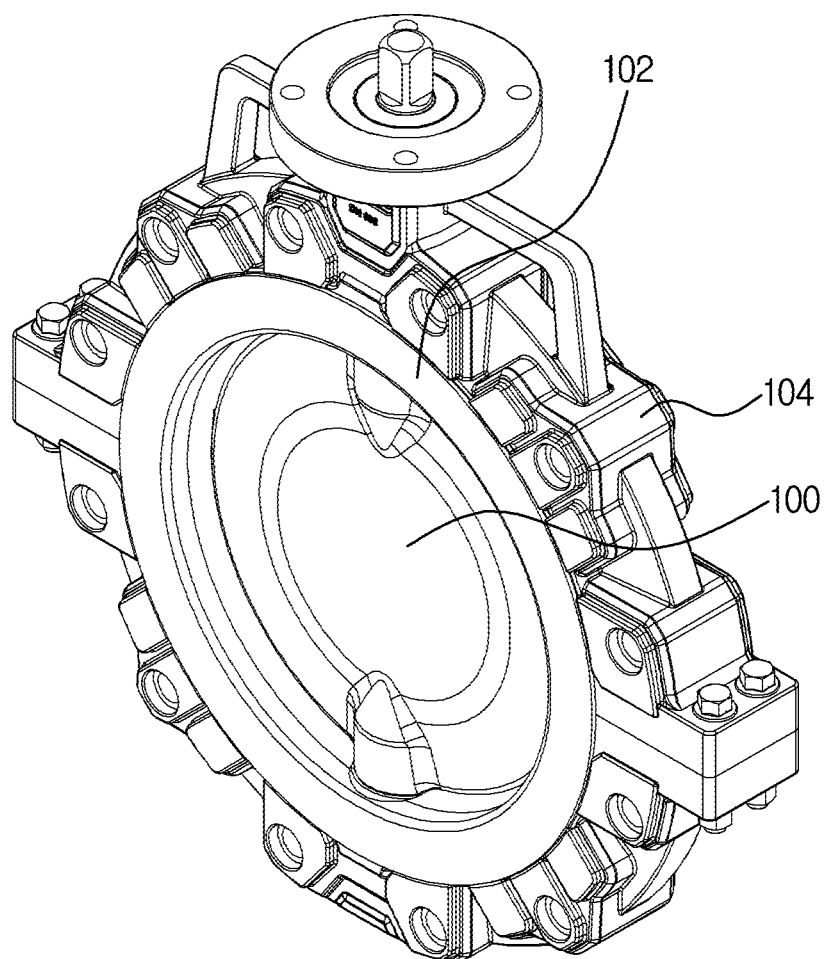
FIG. 1 is a perspective view illustrating a butterfly valve according to an embodiment of the present disclosure.
Figure 2:
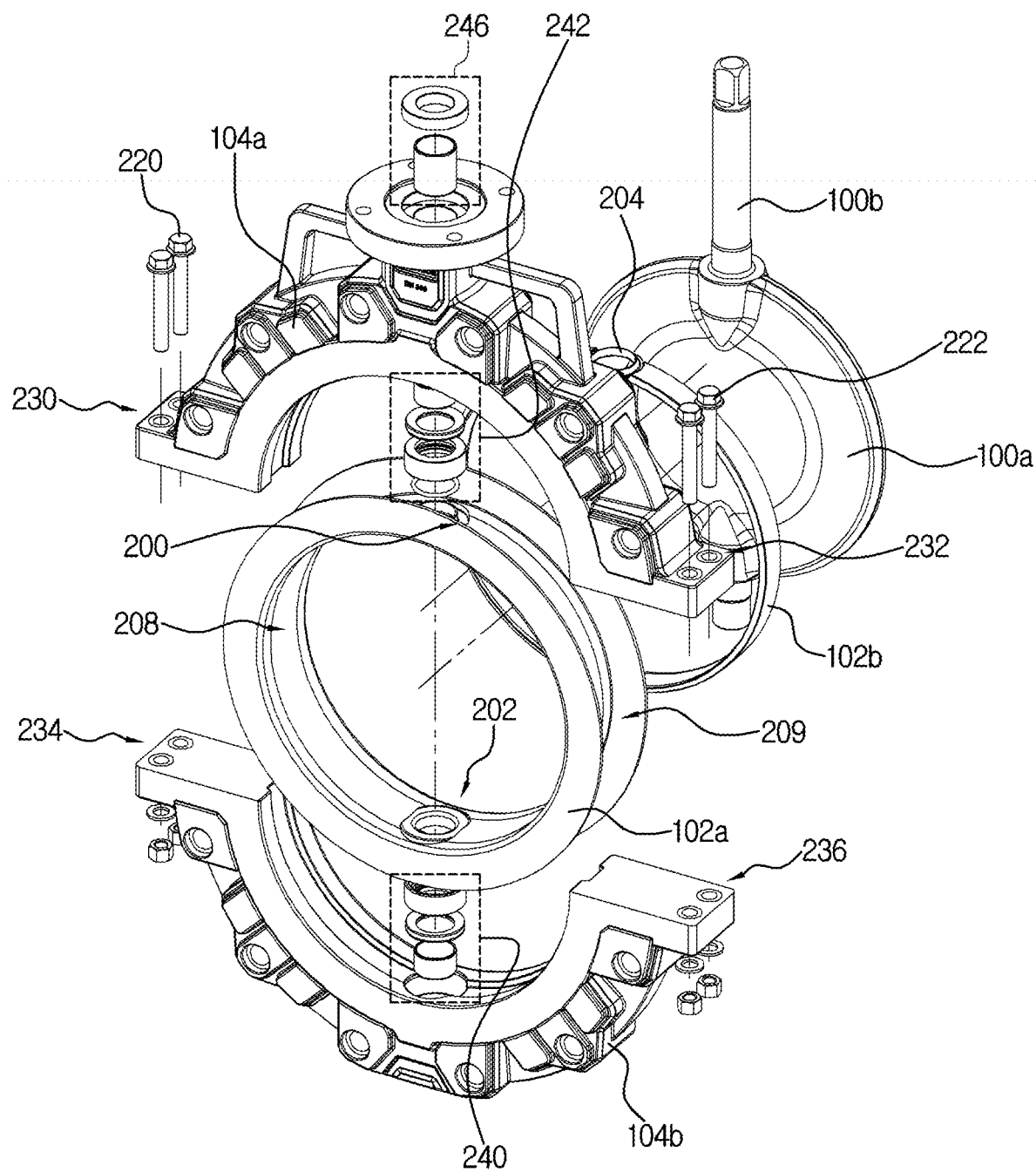
FIG. 2 is a view illustrating a disassemble structure of the butterfly valve according to an embodiment of the present disclosure.
Figure 3:
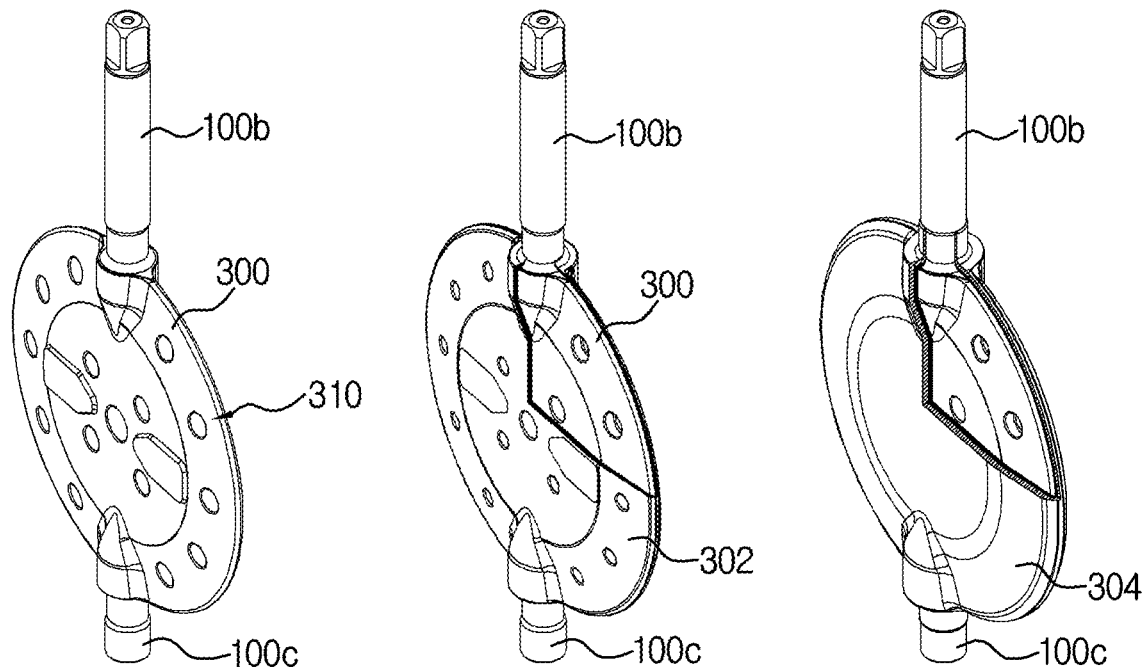
FIG. 3 is a view illustrating a disk according to an embodiment of the present disclosure.
Figure 4:
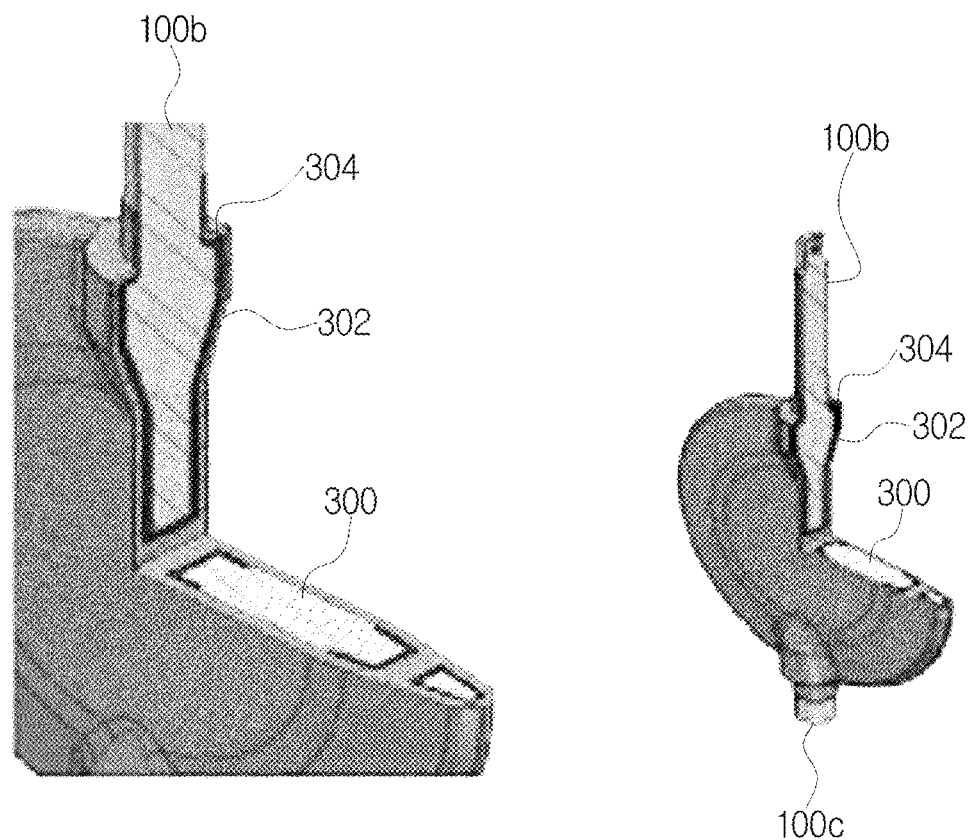
FIG. 4 is a view illustrating partial section of the disk according to an embodiment of the present disclosure.
Figure 5:
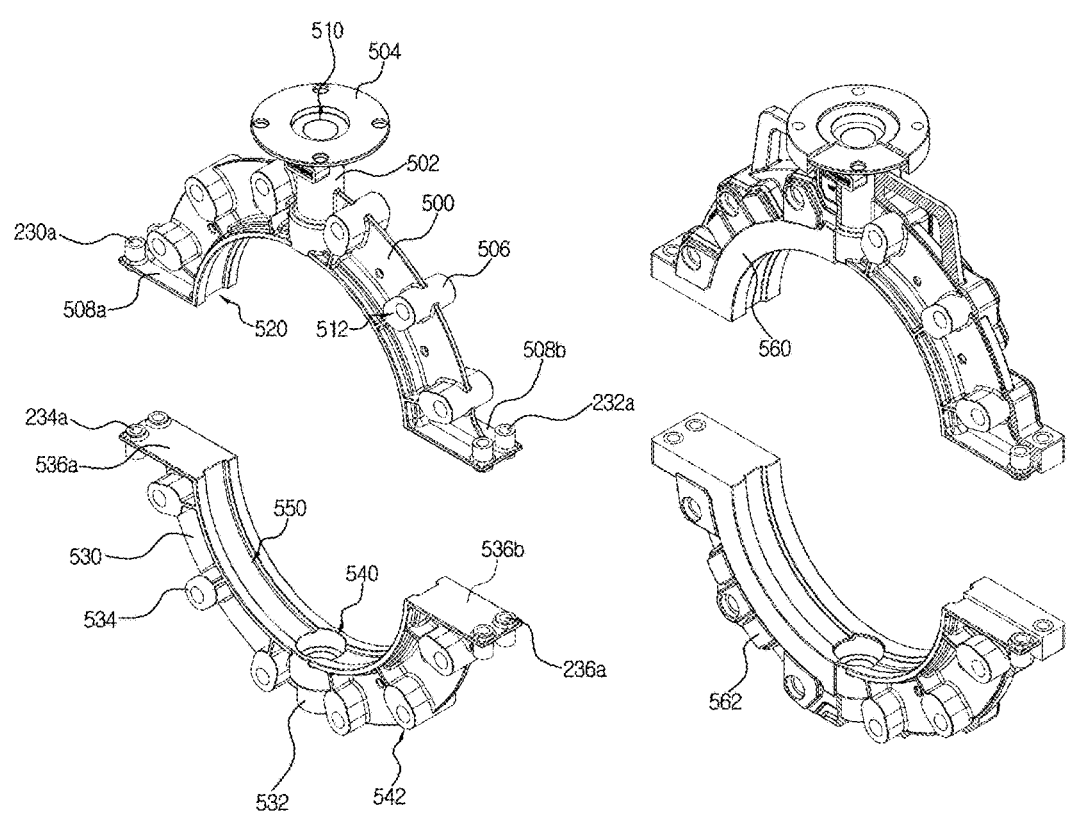
FIG. 5 is a view illustrating an upper body and a lower body according to an embodiment of the present disclosure.
Figure 6:
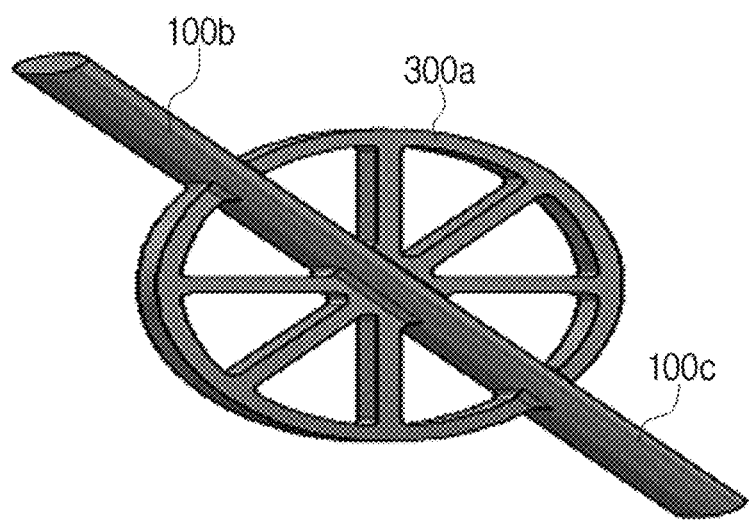
FIG. 6 is a view illustrating a disk body according to an embodiment of the present disclosure.

FIG. 1 is a perspective view illustrating a butterfly valve according to an embodiment of the disclosure, FIG. 2 is a view illustrating a disassemble structure of the butterfly valve according to an embodiment of the disclosure, and FIG. 3 is a view illustrating a disk according to an embodiment of the disclosure. FIG. 4 is a view illustrating partial section of the disk according to an embodiment of the disclosure, FIG. 5 is a view illustrating an upper body and a lower body according to an embodiment of the disclosure, and FIG. 6 is a view illustrating a disk body according to an embodiment of the disclosure.

In FIG. 1, the butterfly valve of the present embodiment includes a disk 100, a disk supporting member 102 and a body 104. In another embodiment, the butterfly valve may include only the disk 100 and the body 104 without the disk supporting member 102.

The disk 100 may be manufactured by forming plastics on a metal, e.g. a light metal such as aluminum through two consecutive molding as described below, and opens or closes flow of a fluid. The disk 100 is opened according as it rotates by for example 90° when the fluid flows through the butterfly valve, and the disk 100 is closed as shown in FIG. 1 when the flowing of the fluid is blocked.

The disk supporting member 102 supports stably the disk 100, and it may be formed of a fluorine resin, for example a Polytetrafluoroethylene, PTFE, a Perfluoroalkoxy alkane PFA or a Polyvinylidene fluoride PVDF, etc. The fluorine resin means every resin including fluorine in a molecule, and has excellent heat resistance, excellent chemical resistance, excellent electric insulation, small friction coefficient, and does not have adhesion.

The body 104 covers the disk supporting member 102, and may be formed by mixing a glass fiber with for example a Polyvinyl Chloride PVC, a polypropylene PP, a Poly Phenylene sulfide PPS, a Polyphthalamide PPA, a Polyamide PA6, a Polyamide PA66, a Polyketone POK or a Polyethylene PE. As a result, strength, impact resistance and mechanical feature of the body 104 may be enhanced. This will be described in detail below.

In another embodiment, the body 104 may be formed by mixing a glass fiber and a carbon fiber with for example, a PVC, a PP, a PPS, a PPA, a PA6, a PA66, a POK or a PE. Accordingly, strength, impact resistance and mechanical feature of the body 104 may be enhanced.

In still another embodiment, the body 104 may be formed by mixing a glass fiber, a carbon fiber and a graphite fiber with for example, a PVC, a PP, a PPS, a PPA, a PA6, a PA66, a POK or a PE. As a result, strength, impact resistance and mechanical feature of the body 104 may be enhanced.

Hereinafter, structure and combination of elements in the butterfly valve of the disclosure will be described in detail.

In FIG. 2 to FIG. 5, a disk 100 may include an opening-closing member 100a, a manipulation member 100b and a fixing member 100c.

The opening-closing member 100a opens or closes flow of a fluid, and may have for example a circular shape. A structure of the opening-closing member 100a will be described below.

The manipulation member 100b is connected to an upper part of the opening-closing member 100a, and it is projected in an upward direction. The manipulation member 100b is projected in an upward direction of an upper body 104a through a hole 510 formed at a central part of the upper body 104a, as shown in FIG. 1. The manipulation member 100b is combined with a control unit (not shown), and rotates in response to control of the control unit. As a result, the opening-closing member 100a is rotated, and thus an opening-closing operation is performed.

The fixing member 100c is inserted into a hole 540 formed at a central part of a lower body 104b, and so the disk 100 may be stably fixed to the body 104. The fixing member 100c is not projected outside when it is inserted, and it may have smaller length than the manipulation member 100b.

The disk supporting member 102 may include a first supporting member 102a and a second supporting member 102b.

The first supporting member 102a may have the same shape as the opening-closing member 100a, e.g. circular shape, and it may have a size higher than the opening-closing member 100a.

In an embodiment, a space (hole) 208 may be formed through a front surface and a rear surface of the first supporting member 102a, and a home 209 may be formed along general circumference of the first supporting member 102a.

In an embodiment, the hole 200 into which the manipulation member 100b is inserted is formed at a top central part of the first supporting member 102a, and a hole 202 into which the fixing member 100c is inserted may be formed at a lower central part of the first supporting member 102a.

The second supporting member 102b may have the same shape, e.g. circular shape as the opening-closing member 100a, an opening member 204 may be formed at a top central part of the second supporting member 102b, an opening member may be formed at a lower central part of the second supporting member 102b, and holes may be respectively formed on the opening member 204 and the opening member. Here, a hole of the opening member 204 corresponds to the hole 200 formed on the top of the first supporting member 102a, and a hole of the opening member formed at the lower central part corresponds to the hole 202 formed on the lower part of the first supporting member 102a.

In an embodiment, the second supporting member 102b may be formed of an Ethylene Propylene Diene Monomer EPDM, a Fluoro Elastomers FKM or a silicon, etc.

The opening-closing member 100a of the disk 100 may be inserted into the space 208 of the first supporting member 102a, and the second supporting member 102b may be combined on a home 209 formed at the top of the first supporting member 102a. That is, the second supporting member 102b fixes stably the opening-closing member 100a by applying a pressure to the opening-closing member 100a of the disk 100 inserted in the space 208 of the first supporting member 102a.

In an embodiment, the opening-closing member 100a of the disk 100 has a little higher size than the space 208 of the first supporting member 102a. An outermost part of the opening-closing member 100a is made up of a plastic to have elasticity, and thus the opening-closing member 100a may be inserted into the space 208 of the first supporting member 102a.

The manipulation member 100b may be exposed outside through a hole 510 formed to a top central part of the upper body 104a, and the fixing member 100c may be inserted into a hole 540 formed to a lower central part of the lower body 104b.

Here, the manipulation member 100b may be stably fixed to the supporting members 102a and 102b and the upper body 104a by using fastening members 242 and 246, and the fixing member 100c may be stably fixed to the lower body 104b by using a fastening member 240.

A structure for fixing the disk 100 and controlling rotation for opening/closing is not limited to the above structure and may be variously modified.

Referring to FIG. 5, the upper body 104a may include an upper base formed of a metal, e.g. a light metal such as an aluminum, etc. and an upper plastic layer 560 formed by mixing a glass fiber with a PVC, a PP, a PPS, a PPA, a PA6, a PA66, a POK or a PE, etc.

The upper base may include an upper framework 500, a reception member 502, a head 504, pipe combination members 506 and bottom members 508a and 508b in both sides.

Top and bottom of the upper framework 500 may have semi-circular shape, and the upper framework 500 may be formed of a metal, especially a light metal. Here, the upper framework 500 and a lower framework 530 may form a space into which the disk supporting member 102 for supporting the disk 100 can be inserted. To fix stably the disk supporting member 102, a home 520 may be formed at a lower outer surface of the upper framework 500, and a home 550 may be formed at an inner surface of the lower framework 530.

The reception member 502 may be longitudinal-extended at a central part of the upper framework 500 in a direction crossing over the upper framework 500, preferably a direction vertical to the upper framework 500, and it may be formed of a metal.

A hole 510 may be formed at the reception member 502, and the manipulation member 100b of the disk 100 may be exposed outside via the hole 510.

The head 504 may be connected to an end part of the reception member 502, be made up of a metal, and have a size higher than the reception member 502. Here, the manipulation member 100b may be projected over the head 504.

The pipe combination member 506 is used for connecting pipes, for example may be a rib projected from the upper framework 500, and may be formed of a metal.

In an embodiment, a hole 512 may be formed on the pipe combination member 506. The butterfly valve may be combined with pipes by passing a fixing member such as a bolt, etc. through the pipes and the butterfly valve after the pipes locate at both sides of the butterfly valve. Here, the bolt may pass through the pipe combination member 506 of the butterfly valve. That is, the pipe combination member 506 may be used for combining the butterfly valve with the pipes.

The bottom members 508a and 508b are formed at both ends of the upper framework 500, respectively. These bottom members 508a and 508b may be used for combination with the lower body 104b, and it may be formed of a metal. For example, a bolt inserting members 230a and 232a may be formed on each of the bottom members 508a and 508b.

The upper plastic layer 560 is formed on the upper base, for example may be formed on the upper base through an insert molding.

In an embodiment, the upper plastic layer 560 may be formed by mixing a glass fiber with a PVC, a PP, a PPS, a PPA, a PA6, a PA66, a POK or a PE.

In another embodiment, the upper plastic layer 560 may be formed by mixing a glass fiber and a carbon fiber with a PVC, a PP, a PPS, a PPA, a PA6, a PA66, a POK or a PE, or by mixing a glass fiber, a carbon fiber and a graphite fiber with a PVC, a PP, a PPS, a PPA, a PA6, a PA66, a POK or a PE.

In still another embodiment, the upper plastic layer 560 may be formed by mixing a carbon fiber with a PVC, a PP, a PPS, a PPA, a PA6, a PA66, a POK or a PE, or by mixing a carbon fiber and a graphite fiber with a PVC, a PP, a PPS, a PPA, a PA6, a PA66, a POK or a PE. As a result, strength, impact resistance or mechanical feature of the upper base may be enhanced.

That is, the upper body 104a may have similar strength to an upper body formed of only steel with including thin thickness of the upper framework 500 made up of a steel by forming the upper plastic layer 560 in which the glass fiber, etc. is mixed. As a result, the upper body 104a may maintain the strength with light weight.

Referring to FIG. 5, the lower body 104b may include a lower base and a lower plastic layer 562. Here, the lower base may have a lower framework 530, a reception member 532, a pipe combination member 534 and bottom members 536a and 536b.

The lower framework 530 may have a shape corresponding to the upper framework 500, for example a semi-circular shape, and it may be made up of a light metal such as an aluminum, etc.

The reception member 532 receives the fixing member 100c of the disk 100 and may be formed of a metal. A hole 540 in which the fixing member 100c is inserted is formed on the reception member 532.

The pipe combination member 534 may perform the same function as the pipe combination member 506, be projected from the lower framework 530 and be formed of a metal. A hole 542 may be formed on the pipe combination member 534.

The bottom members 536a and 536b are formed at both ends of the lower framework 530, respectively. These bottom members 536a and 536b may be used for combination with the upper 104a, and it may be formed of a metal. For example, a bolt inserting members 234a and 236a may be formed on each of the bottom members 536a and 536b. The upper body 104a and the lower body 104b may be combined according as the bolts 220 are inserted into the bolt inserting members 230a, 232a, 234a and 236a as shown in FIG. 2.

The lower plastic layer 562 is formed on the lower base, for example may be formed on the lower base through an insert molding.

In an embodiment, the lower plastic layer 562 may be formed by mixing a glass fiber with a PVC, a PP, a PPS, a PPA, a PA6, a PA66, a POK or a PE.

In another embodiment, the lower plastic layer 562 may be formed by mixing a glass fiber and a carbon fiber with a PVC, a PP, a PPS, a PPA, a PA6, a PA66, a POK or a PE, or by mixing a glass fiber, a carbon fiber and a graphite fiber with a PVC, a PP, a PPS, a PPA, a PA6, a PA66, a POK or a PE.

In still another embodiment, the lower plastic layer 562 may be formed by mixing a carbon fiber with a PVC, a PP, a PPS, a PPA, a PA6, a PA66, a POK or a PE, or by mixing a carbon fiber and a graphite fiber with a PVC, a PP, a PPS, a PPA, a PA6, a PA66, a POK or a PE.

As a result, strength, impact resistance or mechanical feature of the lower body 104b may be enhanced.

That is, the lower body 104b may have similar strength to a lower body formed of only steel with including thin thickness of the lower framework 530 made up of a steel by forming the lower plastic layer 562 in which the glass fiber, etc. is mixed. As a result, the lower body 104b may maintain the strength with light weight.

Hereinafter, structure of the disk 100 will be described in detail.

In FIG. 3 and FIG. 4, the opening-closing member 100a of the disk 100 may include a disk body 300, a first plastic layer 302 and a second plastic layer 304. Two plastic layers 302 and 304 are shown in drawings, but the opening-closing member 100a may include three or more plastic layers.

The disk body 300 is a base framework of the disk 100, and it may be formed of a metal, for example a light metal such as an aluminum, etc.

In an embodiment, the disk body 300 may have a circular shape as shown in FIG. 3, and at least one hole 310 may be formed thereon. On the other hand, the disk body 300 is not limited as a structure in FIG. 3, and it may have a framework structure 300a which has a circular shape and many spaces in the circular shape as shown in FIG. 6.

The first plastic layer 302 may be formed on the disk body 300 through an insert molding. Here, the first plastic layer 302 may cover the whole of the disk body 300.

In an embodiment, the first plastic layer 302 may be formed of high strength plastic, e.g. an engineering plastic or a super engineering plastic. For example, the first plastic layer 302 may be made up of a polyphenylene ethers resin composition including a polyphenylene ethers resin and a polystyrene resin, or a polyimide, a polysulfone, a poly phenylene sulfide, a polyamide imide, a polyacrylate, a polyether sulfone, a polyether ether ketone, a polyether imide, a liquid crystal polyester, a polyether ketone, etc. and their combination.

The second plastic layer 304 may be formed on the first plastic layer 302 through an insert molding. Here, the second plastic layer 304 may cover the whole of the first plastic layer 302 and fill holes on the disk body 300 and the first plastic layer 302.

In an embodiment, the second plastic layer 304 may be formed of a fluorine resin, e.g. a polytetrafluoroethylene PTFE, a Perfluoroalkoxy alkane PFA or a polyvinylidene fluoride PVDF, etc.

In another embodiment, the second plastic layer 304 may be formed of a plastic having a melting point smaller than the first plastic layer 302. For example, the second plastic layer 304 may be formed of the PTFE.

The first plastic layer 302 and the second plastic layer 304 may be formed of plastics having different melting point.

In an embodiment, corrosion resistance or acid resistance of a second plastic of the second plastic layer 304 is excellent than that of a first plastic of the first plastic layer 302, and strength of the first plastic may be better than that of the second plastic. That is, the first plastic may increase the strength of the disk 100, and the second plastic may prevent corrosion or oxidation due to fluid.

Briefly, the opening-closing member 100a of the disk 100 may include the disk body 300, the first plastic layer 302 and the second plastic layer 304 disposed in sequence.

The whole of conventional disk is formed of a steel, and thus it should be manufactured by using a mechanical processing. However, it is difficult to process precisely the steel to have desire shape, and so productivity of the disk gets much lower. As a result, it is impossible to achieve mass production. Of course, since the whole of the disk is formed of steel, the strength of the disk is high, but weight and manufacture cost of the disk are great and the disk is easy to be corroded.

In the disk 100 of the present disclosure, only the disk body 300 as the base framework is formed of the metal, and the plastic layers 302 and 304 are formed on the disk body 300 through two insert moldings.

The disk body 300 is considerably thin compared with the conventional disk, and thus it is easy to process precisely the disk body 300 to have desired shape though mechanical processing is performed. Specially, since precise shape of the disk 100 may be realized through the first plastic layer 302, it is not necessary to process precisely the disk body 300. Hence, it is possible to produce the disk 100 in large quantities.

Corrosion resistance and acid resistance of the disk 100 may be considerably enhanced and the disk 100 may have excellent strength characteristics, due to the plastic layers 302 and 304. Particularly, since the first plastic layer 302 is formed of the engineering plastic or the super engineering plastic, the disk 100 may have very small weight with keeping the strength similar to the conventional disk. For example, when the conventional butterfly valve formed of only steel has weight lkg, the butterfly valve of the present disclosure may have weight 350g with keeping the strength similar to the conventional butterfly valve. That is, super lightweight may be achieved.

On the other hand, the second plastic layer 304 formed of PTFE is directly formed on the disk body 300 formed of the steel without the first plastic layer 302. In this case, the problem exists in that thickness of the PTFE formed on the steel is not constant or uniform (flat). That is, it is difficult to process the disk to have precise shape.

Accordingly, the method of manufacturing the valve of the present disclosure uses high strength plastic (for example, engineering plastic or super engineering plastic) which is practicable easily precise-processing on the metal. That is, the method may produce the disk 100 with precise shape by forming the first plastic layer 302 formed of high strength plastic on the disk body 300 formed of the metal.

Subsequently, the method may form the second plastic layer 304 formed of the PTFE on the first plastic layer 302 formed of the high strength plastic. Here, the PTFE may be formed of constant thickness on the high strength plastic.

Shortly, the opening-closing member 100a of the disk 100 may have enhanced productivity and reduced weight and manufacture cost with maintaining the same precise shape and processing as the conventional disk. Additionally, it is possible to achieve mass production of the butterfly valve.

Only the disk 100 is mentioned in above description. However, the structure of the disk 100 is applicable to every fluid contacting member of valves other than the butterfly valve, wherein the fluid contacting member should have excellent corrosion resistance because it contacts with fluid. That is, the fluid contacting member may include a body formed of a metal, a first plastic layer formed of high strength plastic on the body, and a second plastic layer formed of fluorine resin on the first plastic layer.

Hereinafter, plastic layers 560 and 562 of the body 104 will be described in detail. Since the plastic layers 560 and 562 have the same component, only the plastic layer 560 will be described.

In an embodiment, the plastic layer 560 may be formed by mixing a PP with a glass fiber. Preferably, the glass fiber has 0 weight percent to 40 weight percent, and the PP has a weight percent higher than 60 weight percent. Experimental result is shown in following table 1.

TABLE 1

| embodiment | glass fiber weight percent | Tensile strength (Mpa@23° C.) [ASTM D638] |
|---|---|---|
| comparison | 0 | 25 |
| 1 | 10 | 54 |
| 2 | 15 | 59 |
| 3 | 20 | 78 |
| 4 | 30 | 83 |
| 5 | 40 | 94 |

It is verified through the above table 1 that tensile strength of the plastic layer 560 when the plastic layer 560 is formed by mixing the PP with the glass fiber is very greater than that of a plastic layer formed of only the PP. That is, mechanical property and chemical property may be enhanced. However, it is difficult to manufacture the plastic layer 560 to have desired shape because an insert molding feature for manufacturing the plastic layer 560 is deteriorated when the glass fiber has a weight percent higher than 40 weight percent.

In another embodiment, the plastic layer 560 may be formed by mixing a PPS with a glass fiber. Preferably, the glass fiber has 0 weight percent to 40 weight percent, and the PPS has a weight percent higher than 60 weight percent. Experimental result is shown in following table 2.

TABLE 2

| embodiment | glass fiber weight percent | Tensile strength (Mpa@23° C.) [ASTM D638] |
|---|---|---|
| comparison | 0 | 70 |
| 1 | 30 | 140 |
| 2 | 40 | 200 |

It is verified through the above table 2 that tensile strength of the plastic layer 560 when the plastic layer 560 is formed by mixing the PPS with the glass fiber is greater than that of a plastic layer formed of only the PPS. That is, mechanical property and chemical property may be enhanced, and thus light and strong plastic layer 560 may be formed. However, it is difficult to manufacture the plastic layer 560 to have desired shape because an insert molding feature for manufacturing the plastic layer 560 is deteriorated when the glass fiber has a weight percent higher than 40 weight percent.

In still another embodiment, the plastic layer 560 may be formed by mixing a PPA with a glass fiber. Preferably, the glass fiber has 0 weight percent to 55 weight percent, and the PPA has a weight percent higher than 45 weight percent. Experimental result is shown in following table 3.

TABLE 3

| embodiment | glass fiber weight percent | Tensile strength (Mpa@23° C.) [ASTM D638] |
|---|---|---|
| comparison | 0 | 105 |
| 1 | 25 | 170 |
| 2 | 35 | 210 |
| 3 | 45 | 250 |
| 4 | 55 | 270 |

It is verified through the above table 3 that tensile strength of the plastic layer 560 when the plastic layer 560 is formed by mixing the PPA with the glass fiber is greater than that of a plastic layer formed of only the PPA. That is, mechanical property and chemical property may be enhanced, and thus light and strong plastic layer 560 may be formed. However, it is difficult to manufacture the plastic layer 560 to have desired shape because an insert molding feature for manufacturing the plastic layer 560 is deteriorated when the glass fiber has a weight percent higher than 55 weight percent.

In still another embodiment, the plastic layer 560 may be formed by mixing a PA6 with a glass fiber. Preferably, the glass fiber has 0 weight percent to 50 weight percent, and the PA6 has a weight percent higher than 50 weight percent. Experimental result is shown in following table 4.

TABLE 4

| embodiment | glass fiber weight percent | Tensile strength (Mpa@23° C.) [ASTM D638] |
|---|---|---|
| comparison | 0 | 70 |
| 1 | 15 | 125 |
| 2 | 20 | 145 |
| 3 | 30 | 170 |
| 4 | 33 | 180 |
| 5 | 35 | 185 |
| 6 | 40 | 192 |
| 7 | 45 | 200 |
| 8 | 50 | 220 |

It is verified through the above table 4 that tensile strength of the plastic layer 560 when the plastic layer 560 is formed by mixing the PA6 with the glass fiber is very greater than that of a plastic layer formed of only the PA6. That is, mechanical property and chemical property may be enhanced, and thus light and strong plastic layer 560 may be formed. However, it is difficult to manufacture the plastic layer 560 to have desired shape because an insert molding feature for manufacturing the plastic layer 560 is deteriorated when the glass fiber has a weight percent higher than 50 weight percent.

In still another embodiment, the plastic layer 560 may be formed by mixing a PA66 with a glass fiber. Preferably, the glass fiber has 0 weight percent to 50 weight percent, and the PA66 has a weight percent higher than 50 weight percent. Experimental result is shown in following table 5.

TABLE 5

| embodiment | glass fiber weight percent | Tensile strength (Mpa@23° C.) [ASTM D638] |
|---|---|---|
| comparison | 0 | 80 |
| 1 | 25 | 165 |
| 2 | 30 | 186 |
| 3 | 33 | 196 |
| 4 | 35 | 200 |
| 5 | 50 | 245 |

It is verified through the above table 5 that tensile strength of the plastic layer 560 when the plastic layer 560 is formed by mixing the PA66 with the glass fiber is very greater than that of a plastic layer formed of only the PA66. That is, mechanical property and chemical property may be enhanced, and thus light and strong plastic layer 560 may be formed. However, it is difficult to manufacture the plastic layer 560 to have desired shape because an insert molding feature for manufacturing the plastic layer 560 is deteriorated when the glass fiber has a weight percent higher than 50 weight percent.

In still another embodiment, the plastic layer 560 may be formed by mixing a POK with a glass fiber. Preferably, the glass fiber has 0 weight percent to 40 weight percent, and the POK has a weight percent higher than 60 weight percent. Experimental result is shown in following table 6.

TABLE 6

| embodiment | glass fiber weight percent | Tensile strength (Mpa@23° C.) [ASTM D638] |
|---|---|---|
| comparison | 0 | 60 |
| 1 | 15 | 100 |
| 2 | 20 | 125 |
| 3 | 30 | 140 |
| 4 | 40 | 165 |

It is verified through the above table 6 that tensile strength of the plastic layer 560 when the plastic layer 560 is formed by mixing the POK with the glass fiber is very greater than that of a plastic layer formed of only the POK. That is, mechanical property and chemical property may be enhanced, and thus light and strong plastic layer 560 may be formed. However, it is difficult to manufacture the plastic layer 560 to have desired shape because an insert molding feature for manufacturing the plastic layer 560 is deteriorated when the glass fiber has a weight percent higher than 40 weight percent.

The embodiments of the present disclosure described above are disclosed only for illustrative purposes. A person having ordinary skill in the art would be able to make various modifications, alterations, and additions without departing from the spirit and scope of the disclosure, but it is to be appreciated that such modifications, alterations, and additions are encompassed by the scope of claims set forth below.

What is claimed is:

1. A body covering a disk in a butterfly valve, the body comprising:
    an upper body; and
    a lower body,
    wherein an inserting space is formed by combining the upper body with the lower body,
    the disk is inserted into the inserting space, at least one of the upper body and the lower body includes a framework formed of a metal and a plastic layer formed on the framework,
    a pipe combination member, on which a hole for combining the butterfly valve with a pipe is formed, is projected from the framework, and the butterfly valve is combined with the pipe by inserting a fixing member into the hole of the framework and a hole of the pipe,
    a disk supporting member formed of a fluorine resin for supporting the disk,
    wherein a home is formed at a surface of the framework to fix the disk supporting member,
    wherein the disk supporting member includes a first supporting member and a second supporting member.

2. The body of claim 1,
    wherein the framework of the upper body is included in the plastic layer of the upper body, the framework of the lower body is included in the plastic layer of the lower body,
    the framework of the upper body is separable from the framework of the lower body,
    bottom members are respectively formed at an end part of the framework of the upper body and an end part of the framework of the lower body, and the framework of the upper body and the framework of the lower body are combined through the bottom members.

3. The body of claim 2, wherein the framework of the upper body and the framework of the lower body have a semi-circular shape.

* * * * *